(No Model.)
J. MILLER & T. G. STILES.
DETECTOR BAR CLIP AND LINK.
No. 548,323.  Patented Oct. 22, 1895.
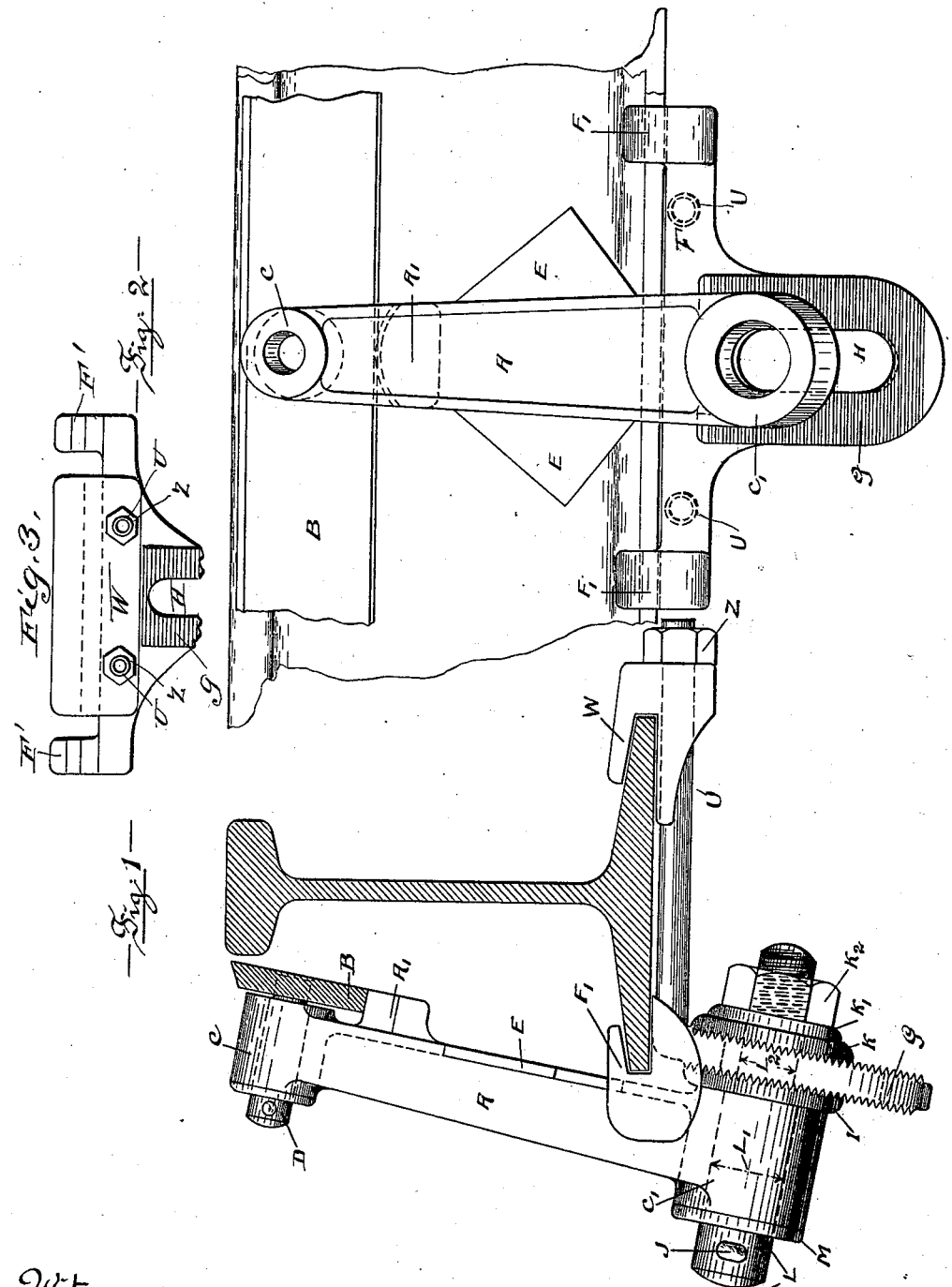

UNITED STATES PATENT OFFICE.

JOHN MILLER AND THOMAS GEO. STILES, OF RAHWAY, NEW JERSEY.

DETECTOR-BAR CLIP AND LINK.

SPECIFICATION forming part of Letters Patent No. 548,323, dated October 22, 1895.

Application filed January 10, 1895. Serial No. 534,437. (No model.)

*To all whom it may concern:*

Be it known that we, JOHN MILLER and THOMAS GEO. STILES, citizens of the United States, residing at Rahway, in the county of Union and State of New Jersey, have invented certain new and useful Improvements in Detector-Bar Clips and Links; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to improvements in the detector-bar or switch-locking system whereby the links whereunto the said bar is pivoted have been made adjustable to any size of flat-bottomed or double-headed rails utilized on railroad or car tracks inside or outside of the rail, and said links or levers have furthermore been furnished with the mechanical means whereby the throw of said bar can be regulated and, lastly, the means of attaching such clips or shoes to the rail in question have been simplified and several methods have been shown and described, all of such mechanical devices as invented by us in connection with same detector-bar, which we claim to be more practical and useful than those in use up to date, tending to lessen the cost largely, as one set of said links or levers now can be manufactured to fit any height or weight of rail, where formerly each and every size or weight of rail had to be furnished with the corresponding size of clips and levers.

In the accompanying drawings like letters of reference indicate corresponding parts in the different views, and, on Sheet 1, Figure 1 represents a side view of our improved adjustable link with its clip and a cross-section of the rail whereunto it is fastened, and Fig. 2 an end view of the main elements in Fig. 1. Fig. 3 is an end view on a reduced scale of clamp W, shown in side view in Fig. 1.

In Fig. 1, A indicates the link as ordinarily used, with detector-bar B pivoted in the usual manner to head C on link A by means of rivet D. Link A is on each side furnished with two wings E, which will only allow the link a certain throw from side to side. From that part of this mechanical device which passes underneath the flange of rail, and which appropriately may be termed its "clip" or "shoe," (designated F,) protrudes downward an indented piece G, having an oblong slot H. On either side of said indented piece G, and furnished with rills to fit in indents of piece G, are two disks I and K, I being pressed in toward G by stud L, passing through head C' of link A and secured in it by washer M and pin J. Disk K, lying on the other side of G, opposite to disk I, has the smaller diameter $L^2$ of bolt L passing through it, and bolt L, being screw-cut at the end, has a washer K' and a nut $K^2$ attached to secure bolt L. As a consequence it will be readily seen that, bolt L's larger diameter L' bearing on disk I and being, as above described, securely attached to link A, disk I will be pressed into the indents of piece G, and disk K will by tightening of screw $K^2$ be pressed into its respective indents of piece G, thus binding link A securely to said piece G. As the hole H through which the smaller diameter $L^2$ of bolt L passes is made oblong up and down, and as piece G is indented correspondingly, it will thus be seen that disks I and K can be moved up and down to suit any height of rail that link A may have to be adjusted to, which was the desired object.

The devices relating to the limiting of the throw to the right or left of link A are the wings E, which being cast on link A in a certain relative proportion to the maximum and minimum height of any rail that will be used will for such reason in the up and down adjustment of link A always have an exact proportionate throw. To support detector-bar B in this above-described manner, link A has a projection A', cast on the side toward the detector-bar, acting as the bearing-surface for detector-bar, which projection can be made flat, proportionate to the throwing angle of the wings, or arc-shaped.

As various mechanical devices can be used to secure the link to the tongue G, we do not limit ourselves to the construction herein shown, but merely show the two sides of the tongue G indented, with their respective disks also indented as one method of fastening same. We might, for instance, also have one side of the tongue indented and the other smooth, and consequently only the disk indented that adhered to the indented side, or both sides of tongue might be made smooth, necessitating no indented disks at all; but as we consider the indented construction the safest and an important element in the whole construction we have illustrated it.

Our device for securing clip to the rail is composed of a clamp W' embracing the edge of the flange of rail, as seen in the side view in Fig. 1, and having two holes drilled in it to admit of the two pieces of pipe U, cast on the clip or shoe, passing through them with their screw-cut ends and being secured there by two nuts Z. By thus tightening said nuts Z clamp W will be forced in over one flange of the rail, while a pull will be exerted on the two pieces of pipe U, drawing the clip or shoe, having hooks or clamps F' attached, in over the opposite flange, binding the clip or shoe securely to the rail, which was the desired object.

Having thus described our invention, what we claim as new and useful, and desire to secure by Letters Patent, is—

1. A combination of a detector bar link and a right and left wing, attached thereunto for the purposes as set forth, substantially as described.

2. A detector bar clip or shoe, having a downward projecting tongue, cast in one piece with the clip or shoe, transversely indented on both sides and having an oblong hole and two disks indented to fit one on each side of said downward extending tongue, in combination with an adjustable fulcrum, as a stud secured by a nut or other appropriate means, binding links, disks and tongue together, substantially as described and for the purposes as set forth.

3. A detector bar link having a right and left wing, the corresponding detector bar clip or shoe having a downward projecting piece furnished with appropriate means to secure detector bar link to it (the downward projecting piece) and with two pieces of pipe cast on, in combination with a clamp embracing the edge of rail, furnished with two holes for the admission of said pipes, and two nuts on the screw-cut ends of said pipes, for the purposes as set forth, substantially as described.

In testimony that we claim the foregoing we have hereunto set our hands this 31st day of December, 1894.

JOHN MILLER.
THOMAS GEO. STILES.

Witnesses:
AUGUST M. TRESCHOW,
AXEL BEEKEN.